United States Patent
Li et al.

(10) Patent No.: US 12,438,453 B2
(45) Date of Patent: Oct. 7, 2025

(54) METHOD AND APPARATUS FOR REDUCING ELECTROMAGNETIC INTERFERENCE IN SWITCHING POWER SUPPLIES

(71) Applicant: Avago Technologies International Sales Pte. Limited, Singapore (SG)

(72) Inventors: Shengyuan Li, Irvine, CA (US); Leon Samuel Wang, Irvine, CA (US); Xicheng Jiang, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 298 days.

(21) Appl. No.: 18/113,004

(22) Filed: Feb. 22, 2023

(65) Prior Publication Data

US 2024/0283353 A1    Aug. 22, 2024

(51) Int. Cl.
*H02M 1/44* (2007.01)
*H02M 3/158* (2006.01)

(52) U.S. Cl.
CPC ............. *H02M 1/44* (2013.01); *H02M 3/158* (2013.01)

(58) Field of Classification Search
CPC .............................. H02M 1/44; H02M 3/158
See application file for complete search history.

(56) References Cited

U.S. PATENT DOCUMENTS

| | | | | |
|---|---|---|---|---|
| 8,125,805 B1 * | 2/2012 | Melanson | ........... | H02M 1/4225 363/41 |
| 8,130,522 B2 * | 3/2012 | Maksimovic | ....... | H02M 3/1584 323/283 |
| 10,536,068 B2 * | 1/2020 | Anwar | ..................... | H02M 1/08 |
| 11,211,872 B1 * | 12/2021 | Jang | .................... | H02M 1/4225 |
| 11,264,977 B1 * | 3/2022 | Choi | .................... | H02M 1/0032 |
| 11,575,304 B2 * | 2/2023 | Upadhyaya | ......... | H02M 3/1584 |
| 12,176,811 B2 * | 12/2024 | Liu | ......... | H02M 3/01 |
| 2004/0095112 A1 * | 5/2004 | Kernahan | ........... | H02M 1/0845 323/282 |
| 2004/0095116 A1 * | 5/2004 | Kernahan | ................. | G06F 1/24 713/300 |
| 2004/0095264 A1 * | 5/2004 | Thomas | .............. | H02M 3/1582 341/53 |
| 2008/0007238 A1 * | 1/2008 | Ohtake | ............... | H02M 3/1588 323/284 |
| 2015/0364998 A1 | 12/2015 | North | | |
| 2021/0367520 A1 * | 11/2021 | Liu | ....................... | H02M 3/158 |
| 2022/0393574 A1 * | 12/2022 | Pervaiz | ............. | H02M 3/33592 |
| 2023/0299672 A1 * | 9/2023 | Hsieh | .................. | H02M 1/0016 323/271 |

OTHER PUBLICATIONS

European Search Report on non-Foley case related to U.S. Appl. No. 18/113,004 Dtd Jul. 2, 2024.

* cited by examiner

*Primary Examiner* — Menatoallah Youssef
*Assistant Examiner* — Khareem E Almo
(74) *Attorney, Agent, or Firm* — Foley & Lardner LLP (57) ABSTRACT

An apparatus of the subject technology includes a circuit consisting of an inductor and a switch to allow a current to flow through the inductor and charge a capacitor of the circuit. A first circuit is coupled to the circuit and is used to simulate an event. A second circuit sets a threshold for triggering the event, while partially compensating a propagation delay.

20 Claims, 9 Drawing Sheets

METHOD AND APPARATUS FOR REDUCING ELECTROMAGNETIC INTERFERENCE IN SWITCHING POWER SUPPLIES

TECHNICAL FIELD

The present description relates generally to electronic circuits, including, for example, a method and apparatus for reducing electromagnetic interference in switching power supplies.

BACKGROUND

A switching-mode power supply (SMPS) switches on a power stage to charge an inductor during a duty cycle time set by a pulse width modulator. The stored energy in the inductor will then be transferred to output by switching off the power stage during the rest of this switching cycle. This kind of switching behavior makes SMPS's startup current a triangular shape instead of a direct current (DC) as in the linear regulators, which suggests that the SMPS's input current would have a high crest factor.

An SMPS operates in pulse-width modulation (PWM) mode with a fixed switching frequency. Depending on the load level, the SMPS either operates in a continuous conduction mode (CCM) or a discontinuous conduction mode (DCM). In the CCM, the inductor current is continuous during the entire period, at steady state. In the DCM, the inductor current will be zero for a portion of the switching period. An inductor current zero-crossing detector circuit detects when the inductor current crosses the zero point and becomes negative. At this moment, a high-side (HS) switch shuts down to prevent the inductor current from flowing in a reverse (n) direction, otherwise the reverse current could discharge the output capacitor, resulting in efficiency loss. Furthermore, the reverse, or negative, inductor current can pull the voltage of the switching node below ground once the HS switch shuts off and inject minority carriers into the substrate and cause a potential latch-up issue.

In case the zero-crossing detector circuit triggers late, e.g., the inductor current already passes the zero-crossing point and becomes negative when the HS switch shuts off, the residual energy in the inductor will form an inductor-capacitor (LC) tank with the switching node capacitance and create ringing at the switching node. Again, there will be moments where the switching node is pulled below ground and causes latch-up concern. Additionally, this high-frequency ringing can potentially cause electromagnetic interference (EMI) issue in neighboring circuitry. An anti-ringing circuit is needed to suppress this high-frequency ringing.

An existing approach uses a zero-crossing detector circuit along with DC trimming using an automatic test equipment (ATE). ATE can be any apparatus that performs tests on a device, known as the device under test (DUT), equipment under test (EUT) or unit under test (UUT), using automation to quickly perform measurements and evaluate the test results. By shorting the switching node to the booster output node by zero-current comparator to mimic (simulate) the zero-crossing, a digital-to-analog (DAC) code is swept from high to low until the zero-current comparator output toggles from high to low. The corresponding DAC code is then used as the zero-current threshold code. Such a trim scheme is not able to capture the impact of the comparator's propagation delay and input and output voltage dependency. Consequently, a conservative positive zero-current threshold code is used. This causes an early zero-crossing trigger, which causes the HS switch to shut off while there is still a positive current in the inductor that has to be discharged to the output via a much less efficient body diodes of HS switch, resulting in less charge reaching the output.

BRIEF DESCRIPTION OF THE DRAWINGS

Certain features of the subject technology are set forth in the appended claims. However, for purposes of explanation, several aspects of the subject technology are depicted in the following figures:

DETAILED DESCRIPTION

The detailed description set forth below is intended as a description of various configurations of the subject technology and is not intended to represent the only configurations in which the subject technology may be practiced. The appended drawings are incorporated herein, and constitute a part of the detailed description. The detailed description includes specific details for the purpose of providing a thorough understanding of the subject technology. However, the subject technology is not limited to the specific details set forth herein, and may be practiced using one or more implementations. In one or more instances, structures and components are shown in block diagram form in order to avoid obscuring the concepts of the subject technology.

According to some aspects, the subject technology is directed to a method and apparatus for reducing EMI in a switching power supply of an electronic device. In some embodiments, examples of the electronic device include, but are not limited to, a health module and a wearable device, such as a smartwatch or any other similar electronic device. Examples of the health module include, but are not limited to, a glucose meter, an oximeter, a muscle stimulator, and similar devices. The disclosed technology modifies an existing approach, which uses a zero-current with DC trimming technique, to account for a loss of efficiency in that approach and to suppress the resulting EMI, as explained herein.

In some embodiments, a regulator circuit of the subject technology comprises a circuit (e.g., boost converter circuit) which includes an inductor and a switch operable to allow a current to flow through the inductor and charge an output capacitor. A first circuit is coupled to the boost converter and includes a DAC circuit and a comparator circuit to mimic (simulate) a current zero-crossing event. A second circuit implements a procedure to set a threshold for triggering the current zero-crossing event while embedding effects of a propagation delay of the comparator. In some embodiments, the zero-crossing event occurs when the inductor current passes zero and becomes negative (e.g., when the HS switch shuts off).

In some embodiments, an integrated circuit of the subject technology comprises a regulator circuit including a boost converter, a first circuit and a second circuit. The boost converter includes an inductor and a switch and is coupled to an output capacitor. The first circuit includes a DAC circuit and a comparator circuit, and the second circuit implements a procedure to set a threshold for triggering a current zero-crossing event that is associated with a current while embedding effects of a propagation delay of the comparator. The switch is operable to block discharging of the output capacitor via a reverse current through the inductor at the threshold for zero-crossing event.

In some embodiments, a communication device of the subject technology comprises a regulator circuit, which includes a boost converter coupled to a capacitor and a first circuit coupled to the boost converter. The boost converter includes an inductor and a switch operable to allow a current to charge the capacitor through the inductor prior to a current zero-crossing event that is associated with the current. The first circuit includes a comparator, and a threshold for triggering the current zero-crossing event is set while embedding effects of a propagation delay of the comparator.

Figure 1A:
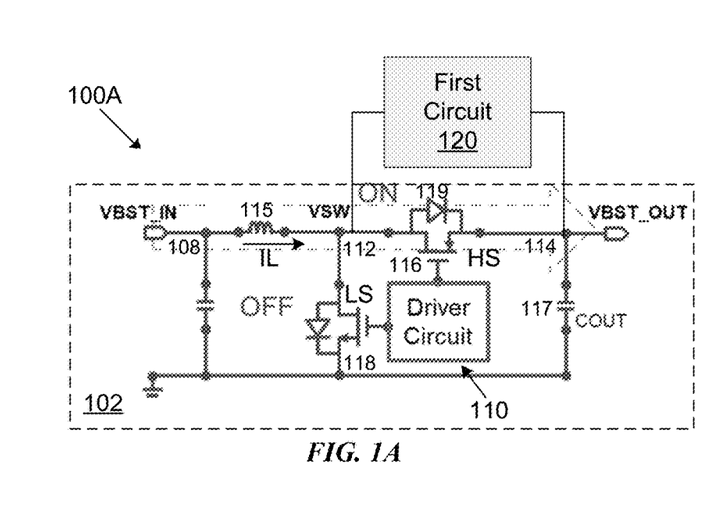
FIGS. 1A, 1B, and 1C are high-level diagrams illustrating an example of a regulator circuit within which some aspects of the subject technology are implemented, and a corresponding chart.
Figure 1B:
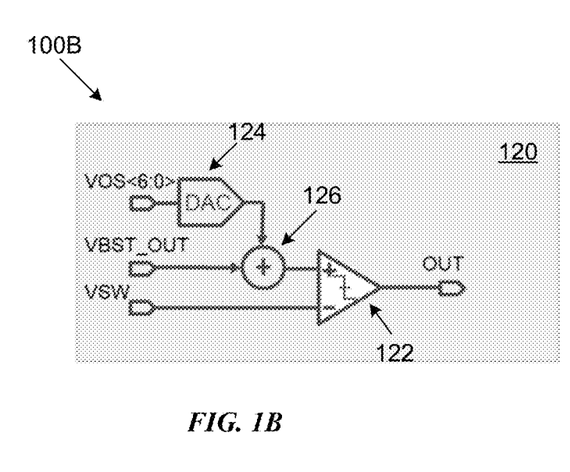
Figure 1C:
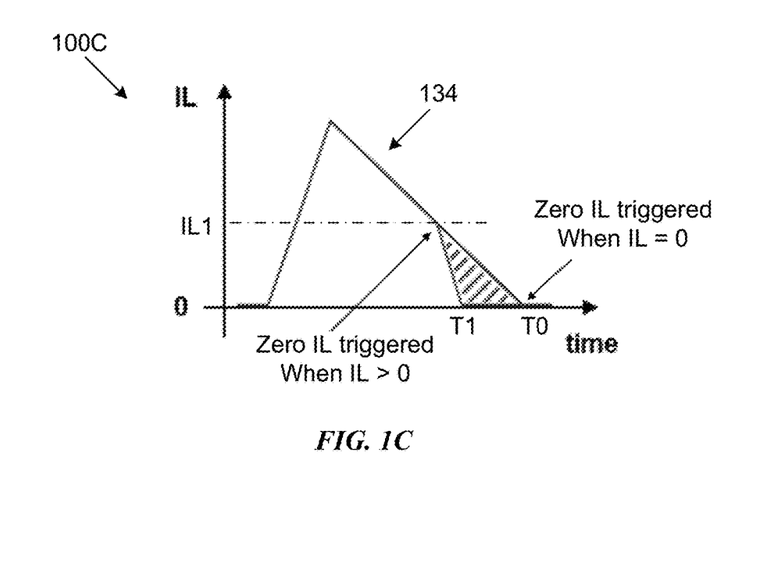

FIGS. 1A, 1B, and 1C are high-level diagrams illustrating an example of a regulator circuit 100A within which some aspects of the subject technology are implemented, a corresponding architecture 100B and a chart 100C. FIG. 1A shows an integrated circuit that implements the regulator circuit 100A, which is a switching regulator. The regulator circuit 100A includes a boost converter circuit 102 and a first circuit 120. The boost converter circuit 102 is a non-limiting example of a power circuit (e.g., power stage circuit, power supply circuit) and other power circuits may be used. The boost converter circuit 102 includes a driver circuit 110, an inductor 115, a first switch 116 (e.g., a high-side (HS) switch), and a second switch 118 (e.g., a low-side (LS) switch). The boost converter circuit 102 is coupled to an output capacitor 117, which is an output capacitor of the boost converter. The driver circuit 110 can generate pulses at switching frequency (fsw, e.g., 2.1 MHz) to control operation of the first switch 116 and the second switch 118, which are complementary switches. That is to say, when the first switch 116 is on, the second switch 118 is off, and vice versa. The first switch 116 is operable to allow a current IL to flow through the inductor 115 and discharge through the output capacitor 117. When the first switch 116 is off, the second switch 118 is on and provides a path for the inductor 115 to charge (e.g., ramp up).

During the discharging, the current IL is continuous until it reaches zero, and if the regulator is operating in the DCM mode, the current remains at zero for the remainder of the switching period (1/fsw), An inductor current zero-crossing detector (see FIG. 1B) detects a current crossing event (e.g., current zero-cross event) that is associated with the current IL, which happens at the moment in time that the current IL crosses zero point and is about to turn negative. At this moment, the first switch 116 has to shut down to block the current IL of the inductor 115 from flowing in reverse, otherwise, it could discharge the output capacitor 117 resulting in efficiency loss. Furthermore, once the first switch 116 shuts off, the reverse, or negative, inductor current (IL) can pull the switching node 112 below ground and inject minority carriers into the substrate of the integrated circuit, which can cause a potential latch-up issue. The reverse or negative inductor current would flow in an opposite direction to the arrow shown in FIG. 1A. In other words, the reverse or negative inductor current would flow from the switching node 112 to the node 108 of FIG. 1A. The latch-up is a failure mechanism of complementary metal-oxide-semiconductor (CMOS) integrated circuits characterized by an excessive current drain coupled with functional failure, parametric failure, and/or device destruction.

The architecture 100B of the first circuit 120 is shown in FIG. 1B. The first circuit 120 includes a DAC circuit 124 and a comparator circuit 122 and can implement a zero current (IL) detector with DC trimming. In some embodiments, the comparator circuit 122 mimics (simulates) a zero-current crossing event that is associated with the inductor current (IL) by comparing the nodes 112 and 114 of the first switch 116 shown in FIG. 1A. When voltage at node 112 (VSW) becomes lower than the voltage at node 114 (VBST_OUT) plus the offset from DAC circuit 124, the inductor current is deemed to be negative and a zero-current crossing event is triggered. The DAC circuit 124 compensates a voltage offset of the comparator circuit 122. For that, at an input port of the DAC circuit 124, a DAC code VOS<6:0> is swept from high to low until an output the comparator circuit 122 toggles from high (logic 1) to low (logic 0). The DAC code that causes the toggling can be used as a current threshold code (e.g., current threshold code). This DAC code, however, may not capture the impact of the propagation delay of the comparator circuit 122, and input and output voltage dependencies of the offset of the comparator circuit 122.

The chart 100C shows a plot 134 of the inductor current (IL). During discharging of the inductor 115, due to the shortcomings of the zero current (IL) with DC trimming scheme implemented by the first circuit 120, a conservative positive zero-current threshold (e.g., IL1) has to be used. This causes an early triggering of the zero-current. That is when the first switch 116 shuts off and there is still a positive current in the inductor 115 that has to be discharged to the output via the much less efficient power body-diode 119 of the filed-effect transistor (FET) (first switch 116). As illustrated on the plot 134, the shaded area is roughly the lower charge to the output with early triggering of the zero-current event.

The subject technology implements an adaptive zero-current threshold scheme to improve upon the zero current (IL) with DC trimming scheme. The adaptive zero-current threshold scheme of the subject technology resolves issues resulting from the shortcoming of the zero current (IL) with DC trimming scheme by adding a second circuit, as described in more detail below. The second circuit implements a procedure to set a threshold for triggering the current zero-crossing event while embedding effects of a propagation delay of the comparator. In some embodiments, the second circuit uses the zero-current threshold to determine a time to turn off the first switch 116 of FIG. 1A. In some embodiments, the second circuit implements the procedure by determining a zero-current threshold based on a first code and a second code. Furthermore, the second circuit includes digital circuitry to determine the second code that includes dependencies of the comparator on an input voltage and an output voltage of the boost converter. Additionally, the integrated circuit of the subject technology includes an anti-ring circuit to reduce (diminish) an EMI resulting from an oscillation by an inductance-capacitance (LC) tank within the boost converter circuit 102 (e.g., from the inductor 115 and the output capacitor 117), as described in more detail herein.

Figure 2:
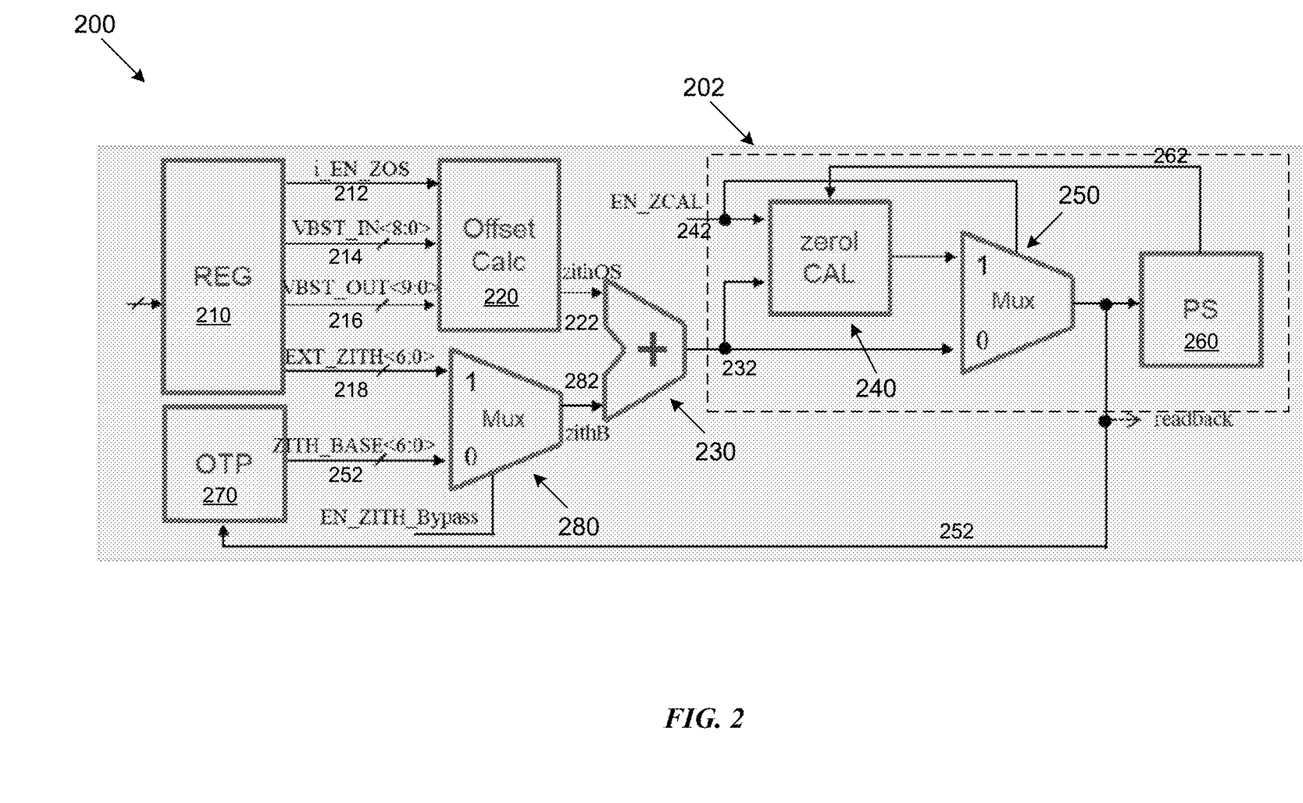
FIG. 2 is a block diagram illustrating an example of an integrated circuit implementing the first step of an adaptive zero-current threshold scheme, according to aspects of the subject technology.

FIG. 2 is a block diagram illustrating an example of an integrated circuit 200 implementing a first step of an adaptive zero-current threshold scheme (e.g., zero-current threshold scheme), according to aspects of the subject technology. The integrated circuit 200 is the first part of the second circuit that implements the procedure to set the threshold for triggering the current crossing event by determining an adaptive zero-current threshold based on a first code and a second code. In some embodiments, the adaptive zero-current threshold scheme of the subject technology is an example of the procedure to set the threshold for triggering the current zero-crossing event and includes two steps. In the first step, a first code (base code) is obtained via an ATE closed-loop auto-calibration (auto-cal) trimming to capture (account for) the propagation delay of the comparator 126 of FIG. 1B. In some embodiments, the trimming includes a closed-loop auto-calibration trimming implemented via an ATE. The word "trimming" is a term of art for making fine adjustments. In the second step, a second code (offset code) is generated by using digital circuitry to account for the input and output voltage dependencies of the inductor discharge rate, which would affect the used threshold for triggering the zero-crossing event precisely at zero current.

The integrated circuit 200 includes a register 210, an offset calculator circuit 220, an adder 230 (an arithmetic adder), a zero-current calibration circuit 240 (zeroI CAL), a multiplexer (MUX) 250, a power stage (PS) block 260, a one-time programmable (OTP) register 270, and a MUX 280. The zero-current calibration circuit 240, the MUX 250, and the PS 260 form a block 202, which is the closed-loop block that implements the auto-calibration trimming to capture the propagation delay of the comparator 126. When the selection signal 242 (EN_ZCAL) is set to high (logic 1), the output of the zero-current calibration circuit 240 is transferred through the MUX 250 to PS block 260, which provides a feedback signal 262 to the zero-current calibration circuit 240. The final output of the MUX 250 is a code 252 that represents the first code and is stored in the OTP register 270. The code 252 representing the first code can be retrieved from the OTP register 270. It is noted that the first code (e.g., code 252 of FIG. 2) is obtained with the VIN, min and the VOUT, max of the operation range. Further details of the operation of the zero-current calibration circuit 240 is described below with respect to FIG. 3A.

The second code (offset code) is determined by the offset calculator circuit 220 that receives input signal/data 212, 214, and 216 from the register 210. The input signal/data 212, 214, and 216, respectively, represent a zero-current offset enable signal (i_EN_ZOS), a boost converter input voltage (VBST_IN), an a boost converter output voltage (VBST_OUT) The output 222 of the offset calculator circuit 220 is a second code, which represents the zero-current threshold offset (zithOS). The output 222 (second code) is added to the code 282 (first code) by the adder 230 to generate a signal 232 which represents the sum of the first code and the second code. In some embodiments, the code 252 (first code), stored in the OTP 270, can be overridden with an external zero-current threshold (EXT_ZITH) 218 stored in register 210 by using mux 280 Further details of the circuitry implementing the offset calculator circuit 220 is described below with respect to FIG. 4.

Figure 3A:
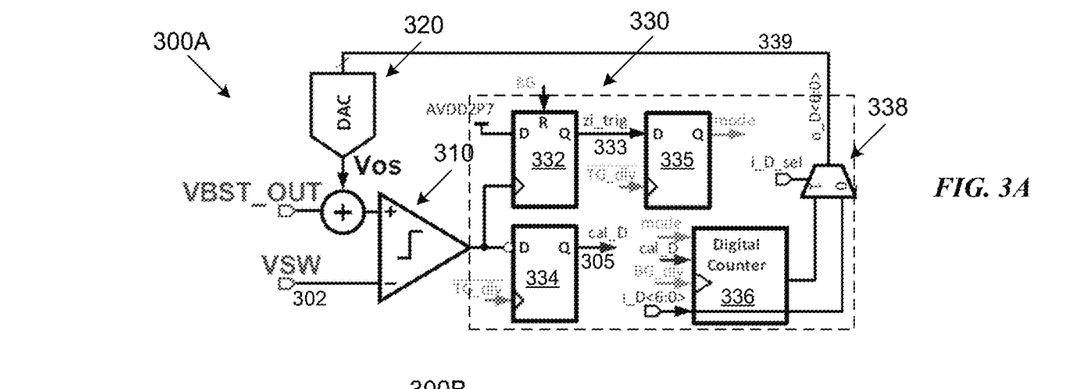
FIGS. 3A and 3B are a block diagram illustrating an example of an integrated circuit implementing the first step of the adaptive zero-current threshold scheme and a corresponding chart, according to aspects of the subject technology.
Figure 3B:
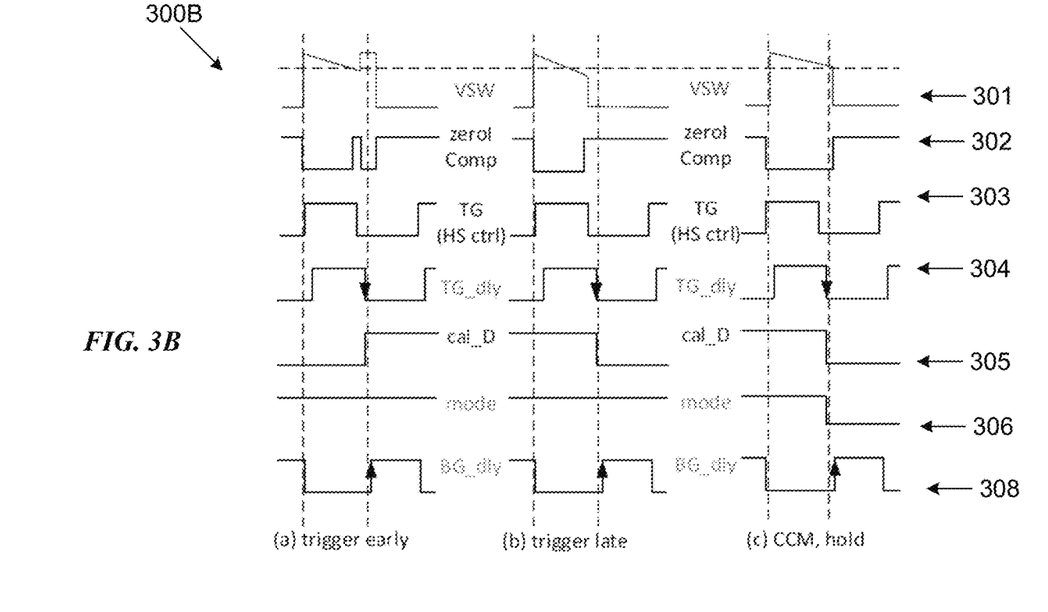

FIGS. 3A and 3B are a block diagram illustrating an example of an integrated circuit 300A implementing the first step of the adaptive zero-current threshold scheme and a corresponding chart 300B, according to aspects of the subject technology. The integrated circuit 300A is the second part of the second circuit, and includes a comparator circuit 310, a DAC circuit 320, and a calibration circuit 330. The comparator circuit 310 and the DAC circuit 320 correspond to the comparator circuit 122 and the DAC circuit 124, respectively, of FIG. 1B, and are responsible for accounting for the offset voltage and propagation delay of the comparator 310. The comparator circuit 310 and the DAC circuit 320 are part of the PS block 260 of FIG. 2, and the calibration circuit 330 implements the zero-current calibration circuit 240 of FIG. 2.

In some embodiments, the calibration circuit 330 includes, but is not limited to, three flip-flops (FFs) 332, 334, and 335, a digital counter 336, and a multiplexer 338. In some embodiments, the calibration circuit 330 receives an output of the comparator 310 and generates a control signal to turn off the first switch 116 of FIG. 1 and provides the digital code 339, which is a base code, for the DAC circuit 320 to compensate a propagation delay of the comparator 310. The terms "compensate," "compensates," or "compensating" refer to offsetting a value, which may include eliminating or partially eliminating the value.

The chart 300B includes plots 301, 302, 303, 304, 305, 306 and 308, respectively, representing a voltage (VSW) signal at the switching node (e.g., node 112 of FIG. 1A), a zero-current compensation (zeroI Comp) signal, a top-gate (TG) signal controlling the first switch 116 of FIG. 1A, a delayed version of TG (TG-dly), a calibration data (Cal_D), a mode signal, and a delayed bottom-gate (BG-dly) signal controlling the second switch 118 of FIG. 1A. The signals are shown for (a) trigger early, (b) trigger late, and (c) CCM hold cases.

The operation of the calibration circuit 330 begins with running the boost converter (e.g., boost converter circuit 102 of FIG. 1A) at a light load (e.g., a few milliamps (mA)) for a DCM operation. When the first switch 116 is on and VSW<VBST_OUT+Vos, zeroI comp signal (of plot 302) and the output 333 (zi_trig) of the FF 332 will toggle high to turn off the first switch 116. When the first switch 116 is off, the zeroI comp signal (of plot 302) is checked to determine the polarity of the current IL through the inductor 115 of FIG. 1A. If the current IL is greater than zero when the first switch 116 is off, the switching node voltage (VSW) goes up and zeroI comp signal (of plot 302) toggles low. This is the trigger early case (a), where mode=1 and calibration data of plot 305 (CAL_D)=1, which results in an increase in the digital code 339 and a decreased offset at input of comparator 310.

However, if the current IL is less than zero, the switching node voltage (VSW) stays low and zeroI comp signal (of plot 302) stays high. This is the trigger late case (b) where mode=1 and calibration data of plot 305 (CAL_D)=0, which results in a decrease in the digital code 339 and an increased offset at the input of the comparator 310.

Case (c) is a CCM mode where the zeroI comp signal does not toggle high and the switching node voltage (VSW) stays greater than VBST_OUT+Vos when the first switch 116 is on. This results in mode=0, calibration data of plot 305 (CAL_D)=do not care, leading to the digital code 339 not being updated (hold). Once the calibration circuit 330 settles, the output of the MUX 338 would be the first code (base code) for the zero current threshold (zeroI_TH).

Figure 4:
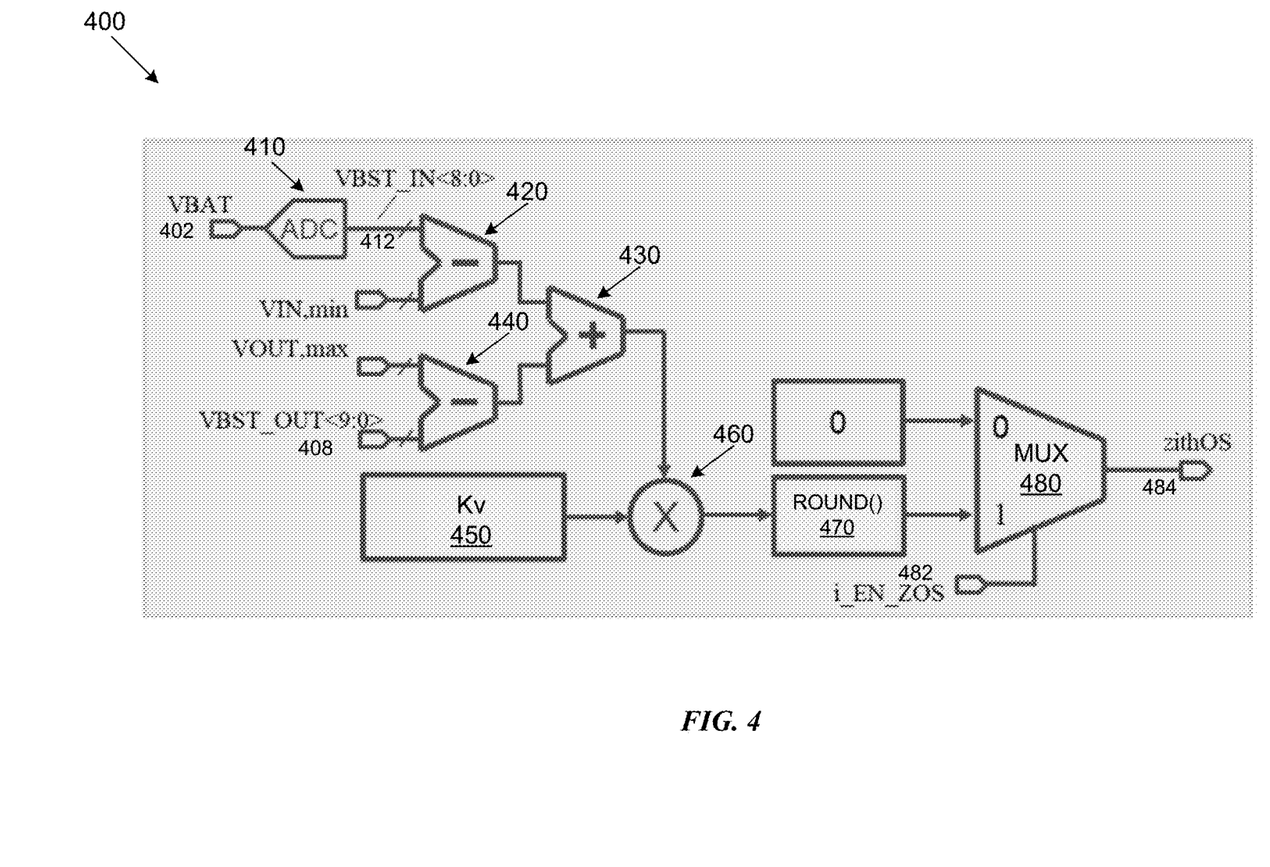
FIG. 4 is a block diagram illustrating an example of an integrated circuit implementing the second step of an adaptive zero-current threshold scheme, according to aspects of the subject technology.

FIG. 4 is a block diagram illustrating an example of an integrated circuit 400 implementing the second step of an adaptive zero-current threshold scheme, according to aspects of the subject technology. In some embodiments, the integrated circuit 400 is the third part of the second circuit and comprises digital circuitry that implements an arithmetic block (e.g., offset calculator circuit 220 of FIG. 2) to determine the second code using the lowest value of VIN (VIN,min) (e.g., minimum input voltage) and the highest value of VOUT (VOUT,max) (e.g., maximum output voltage) of the boost converter circuit 102 of FIG. 1A. In some embodiments, the value of VIN, min is about 2.5 V, and the value of the VOUT, max is about 5.6 V.

The integrated circuit 400 includes an analog-to-digital converter (ADC) 410, a first subtractor 420, an adder 430, a second subtractor 440, a multiplier 460, a rounding block 470, and a MUX 480. The ADC 410 converts the battery voltage 402 (VBAT) into a digital signal 412 (VBST_IN), from which VIN,min is subtracted by the first subtractor 420. The second subtractor 440 subtracts the boost converter output voltage 408 (VBST_OUT) from VOUT,max, and sends the result to the adder 430 to be added to the result of the first subtractor 420. The output of the adder 430 is multiplied, via the multiplier 460, by a design-dependent parameter 450 (Kv), and the result is rounded by the rounding block 470 and sent to the MUX 480, where setting of a selection signal 482 (i_EN_ZOS) is transferred to the output of the MUX 480 to form the second code 484, which is shown as the zero-current threshold offset (zithOS) that represents the output 222 of the offset calculator circuit 220 of FIG. 2. In some embodiments, the value of VIN can be within a range of about 2.5 V to 4.55 V, and the value of VOUT can be within a range of about 4.7 V to 5.6 V.

As noted above, the first code (e.g., code 252 of FIG. 2) is obtained with the VIN, min and the VOUT, max of the operation range. With this first code, zero-current will not trigger late for any other combinations of values of the VIN and VOUT. For any other combination of values of the VIN and VOUT, the offset calculator circuit 220 implemented by the integrated circuit 400 is used to find the second code (zithOS). The final zero-current threshold for a particular VIN/VOUT would be the first code (zithB)+the second code (zithOS). Note that the value of the second code (zithOS) calculated by the offset calculator circuit 220 (implemented by the integrated circuit 400) with i_EN_ZOS set to zero, which can be expressed as follows:

$$zithOS = \mathrm{Round}\left\{Kv*\left[(VBAT-VN, \min) + (Vout, \max - \mathrm{VBST\_OUT})\right]\right\}$$

where Kv is the design-dependent parameter 450, which is typically equal to one.

Figure 5A:
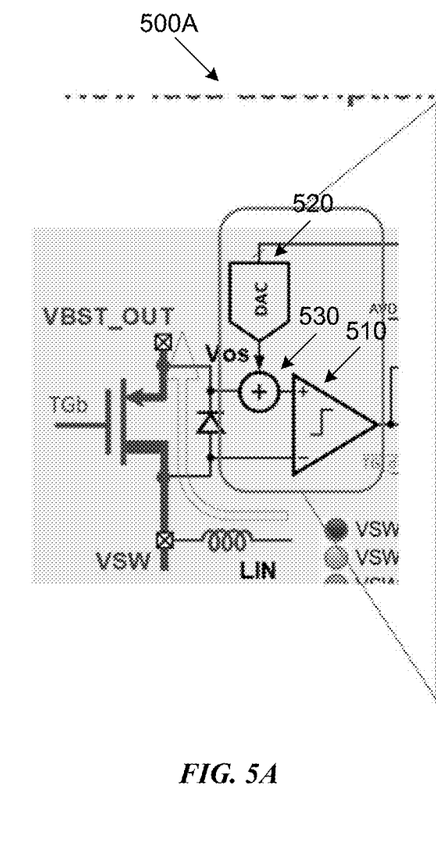
FIGS. 5A and 5B are schematic diagrams illustrating an example implementation of a portion of an integrated circuit, according to aspects of the subject technology.
Figure 5B:
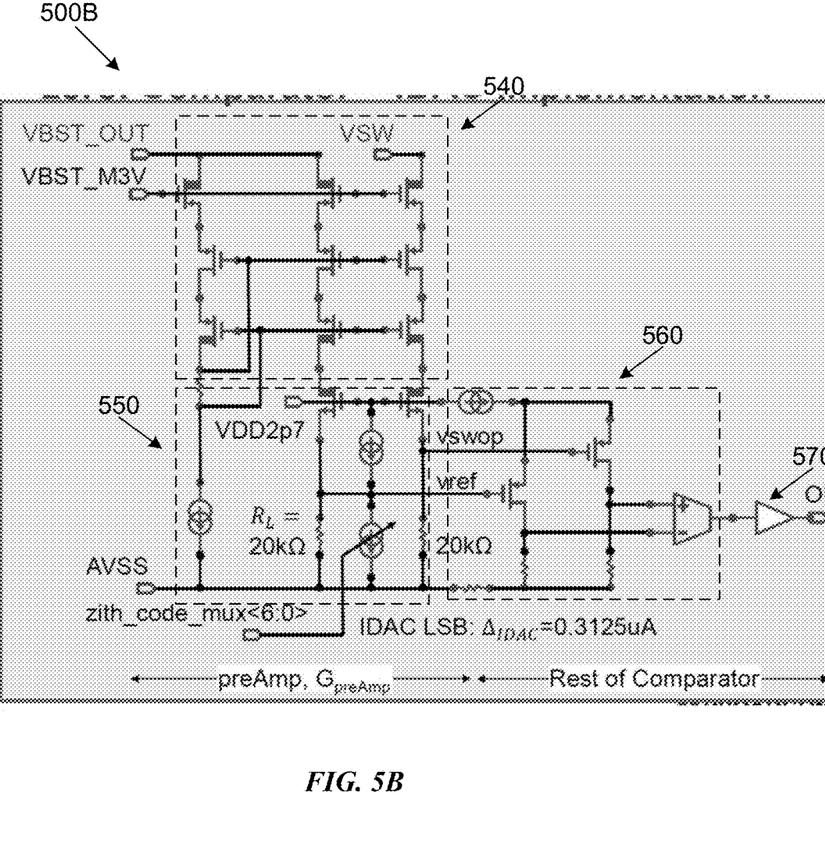

FIGS. 5A and 5B are schematic diagrams illustrating an example implementation 500B of a portion of an integrated circuit 500A, according to aspects of the subject technology. The integrated circuit 500A includes a portion of the boost converter circuit 102 in FIG. 1A, namely the HS switch 116 and the first circuit 120 which consists of a comparator 510, a DAC 520, and an adder 530. These correspond to 122, 124, and 126, respectively in FIG. 1B The implementation 500B includes blocks 540, 550, 560 and a buffer 570. The block 540 formed of N-type MOS (NMOS) and P-type MOS (PMOS) transistors implements a preamplification stage off the comparator 510. The block 550 formed of NMOS transistors and current sources is used to implement the DAC 520. The block 560 formed of PMOS transistors, a current source and an output stage implements a differential gain stage of the comparator 510. The output of the block 560 is delivered to a buffer 570.

Figure 6A:
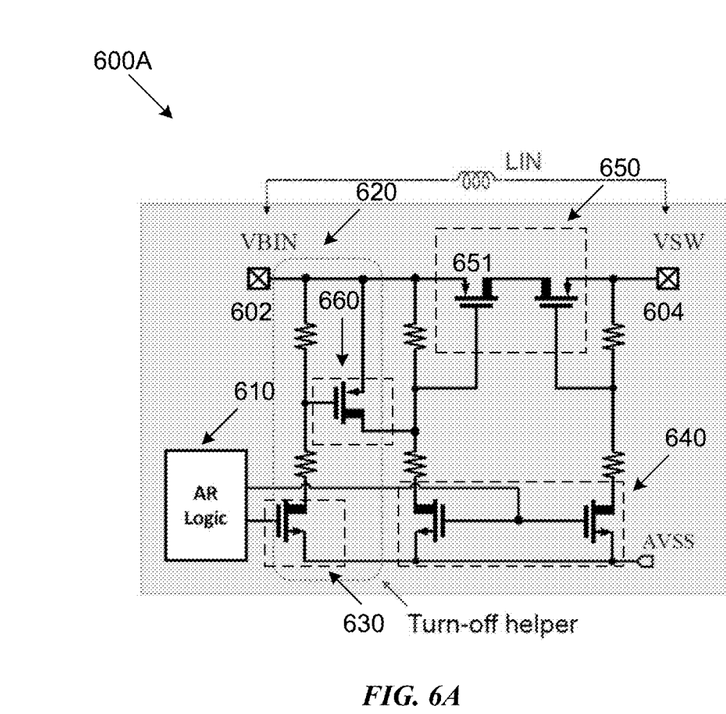
FIGS. 6A and 6B are a schematic diagram illustrating an example of an integrated circuit implementing an anti-ringing scheme and a corresponding chart, according to aspects of the subject technology.
Figure 6B:
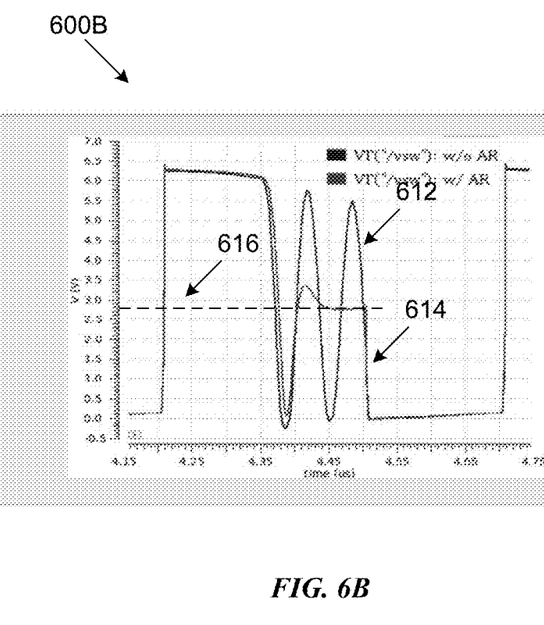

FIGS. 6A and 6B are a schematic diagram illustrating an example of an integrated circuit 600A implementing an anti-ringing scheme and a corresponding chart 600B, according to aspects of the subject technology. The integrated circuit 600A includes an anti-ringing logic 610 coupled to an NMOS transistor 630 and a pair 640 of NMOS transistors. A pair of PMOS transistors 650 are operable to short terminals of an inductor LIN connected the between the input node 602 and a switching node 604. When the pair 640 of NMOS transistors are on, the pair of PMOS transistors 650 are conducting and therefore shorting the input node 602 to the switching node 604. To turn off the pair of PMOS transistors 650, the turn-off helper circuit 620 is used to quickly turn off the pair of PMOS transistors 650. For that to happen, the NMOS transistor 630 is turned on to cause the PMOS transistor 660 to conduct and quickly discharge a gate-source capacitance of the PMOS transistor 651.

The chart 600B shows plots 612 and 614. The plots 612 and 614 depict time variation of the voltage at switching node 604, without and with the application of the integrated circuit 600A. The plot 612 shows oscillations by an inductance-capacitance (LC) tank, which are not desirable. The subject technology uses the integrated circuit 600A to reduce (diminish) oscillations. As shown by the plot 614, the voltage at switching node 604 settles to a value, as indicated by the broken line 616, which is the input voltage at the input node 602.

FIGS. 7A, 7B, 7C and 7D are charts 700A, 700B, 700C, and 700D, illustrating example verification measurement results, according to aspects of the subject technology. The chart 700A shows plots 702, 704, 706, 708, 710 and 712. Plots 702, 704, 706 illustrate time variation of LD, MD, and HD voltage waveforms, where LD, MD, and HD, respectively, correspond to VIN=4.5V and VOUT=4.7 V (LD), VIN=3.85 V and VOUT=5.2 V (MD) and VIN=2.8 and VOUT=5.6 V (HD). The plots 708, 710 and 712 depict time variation of LD, MD, and HD inductor current IL (e.g., IL of FIG. 1A) waveforms. The data in the chart 700A is based on a pulse-frequency modulation (PFM) current threshold (IPFM_TH) of 40 mA.

Figure 7A:
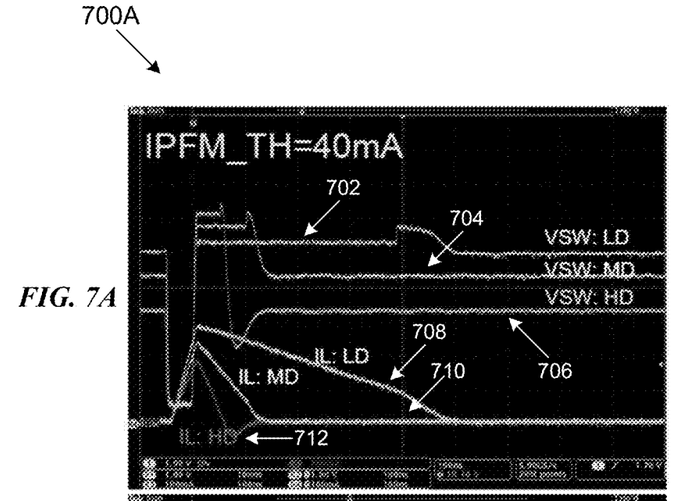
FIGS. 7A, 7B, and 7C and 7D are charts illustrating example verification measurement results, according to aspects of the subject technology.
Figure 7B:
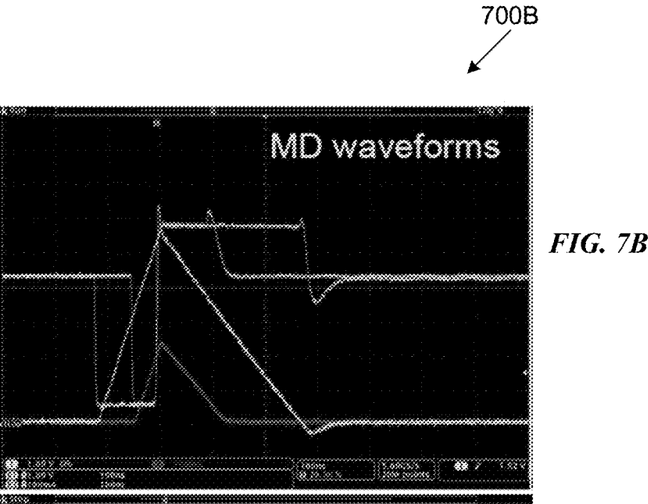
Figure 7C:
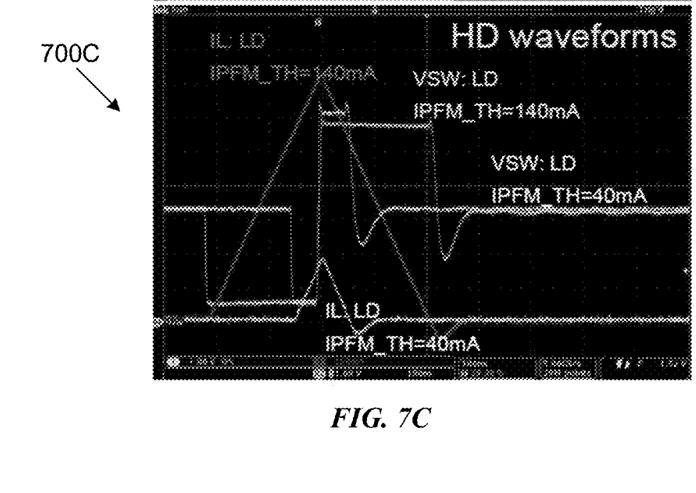
Figure 7D:
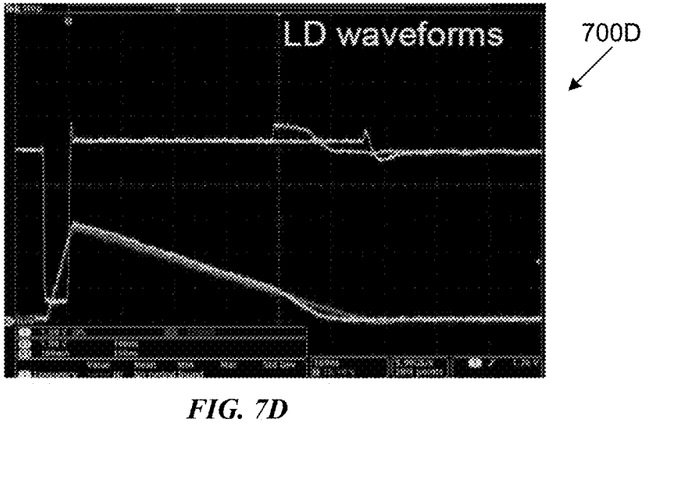

The charts 700B, 700C and 700D, respectively, show magnified versions of the MD, HD, and LD waveforms as shown in the plots of FIG. 7A.

Figure 8:
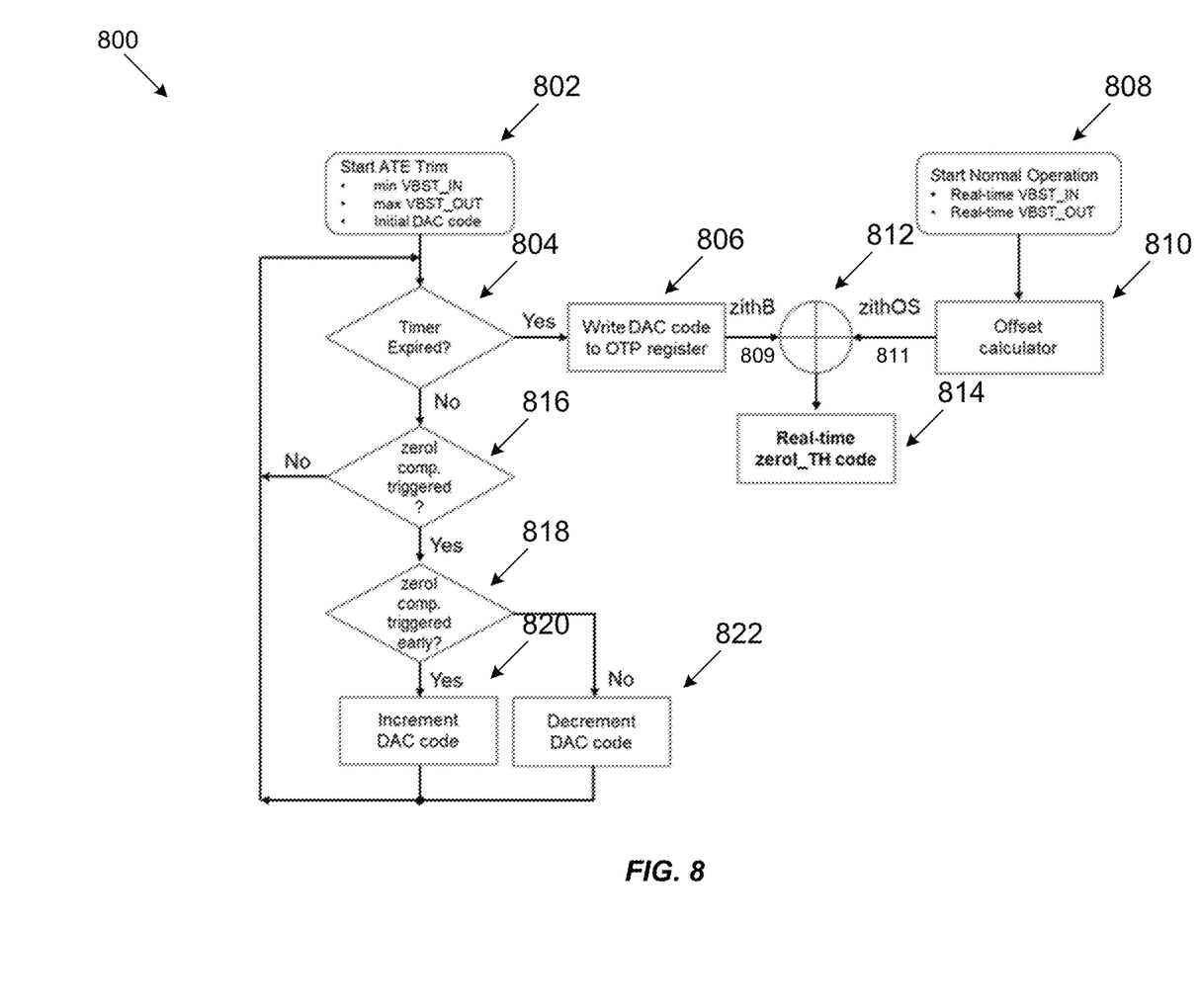
FIG. 8 is a flow diagram illustrating a process for implementing an adaptive zero-current threshold scheme, according to aspects of the subject technology.

FIG. 8 is a flow diagram illustrating a process 800 for implementing an adaptive zero-current threshold scheme implemented by the integrated circuits 200 of FIG. 2, 300A of FIG. 3A and 400 of FIG. 4, according to aspects of the subject technology. In some embodiments, the process 800 is an example of the procedure to set the threshold for triggering the zero-crossing event, mentioned above. The process 800 starts at operation block 802, where an ATE trim is started using the lowest value of VBST_IN, the highest value of VBST_OUT, and an initial DAC code. At operation block 804, it is checked to see whether or not a timer has expired. If the timer has expired, at operation block 806, the DAC code, which is the first code 809 (base code, zithB)

(calculated by the block 202 of FIG. 2), is written to an OTP register (e.g., OTP register 270 of FIG. 2). At operation block 808, a normal operation is started with a real-time VBST_IN and a real-time VBST_OUT. At operation block 810, the offset calculation is performed (e.g., by the offset calculator circuit 220 of FIG. 2) to obtain the second code 811 (offset code, zithOS). At operation block 812, the first code 809 is added (by the adder 230 of FIG. 2) to the second code 811 to obtain the real-time zero-current threshold (zeroI_TH) code 814.

If the timer is not expired, at operation block 816, it is checked to see whether or not the zero-current comparator has triggered. If the zero-current comparator has not triggered, the control is passed to the operation block 804. Otherwise, if the zero-current comparator has triggered, and the control is passed to the operation block 818, where it is checked to see whether or not the zero-current comparator is triggered early. If the zero-current comparator is triggered early, at operation block 820, the DAC code is incremented, and control is passed to the operation block 804. Otherwise, if the zero-current compensation is not triggered early, at operation block 822, the DAC code is decremented, and control is passed to the operation block 804. The DAC code continues to be incremented or decremented until the timer expires in block 804.

Figure 9:
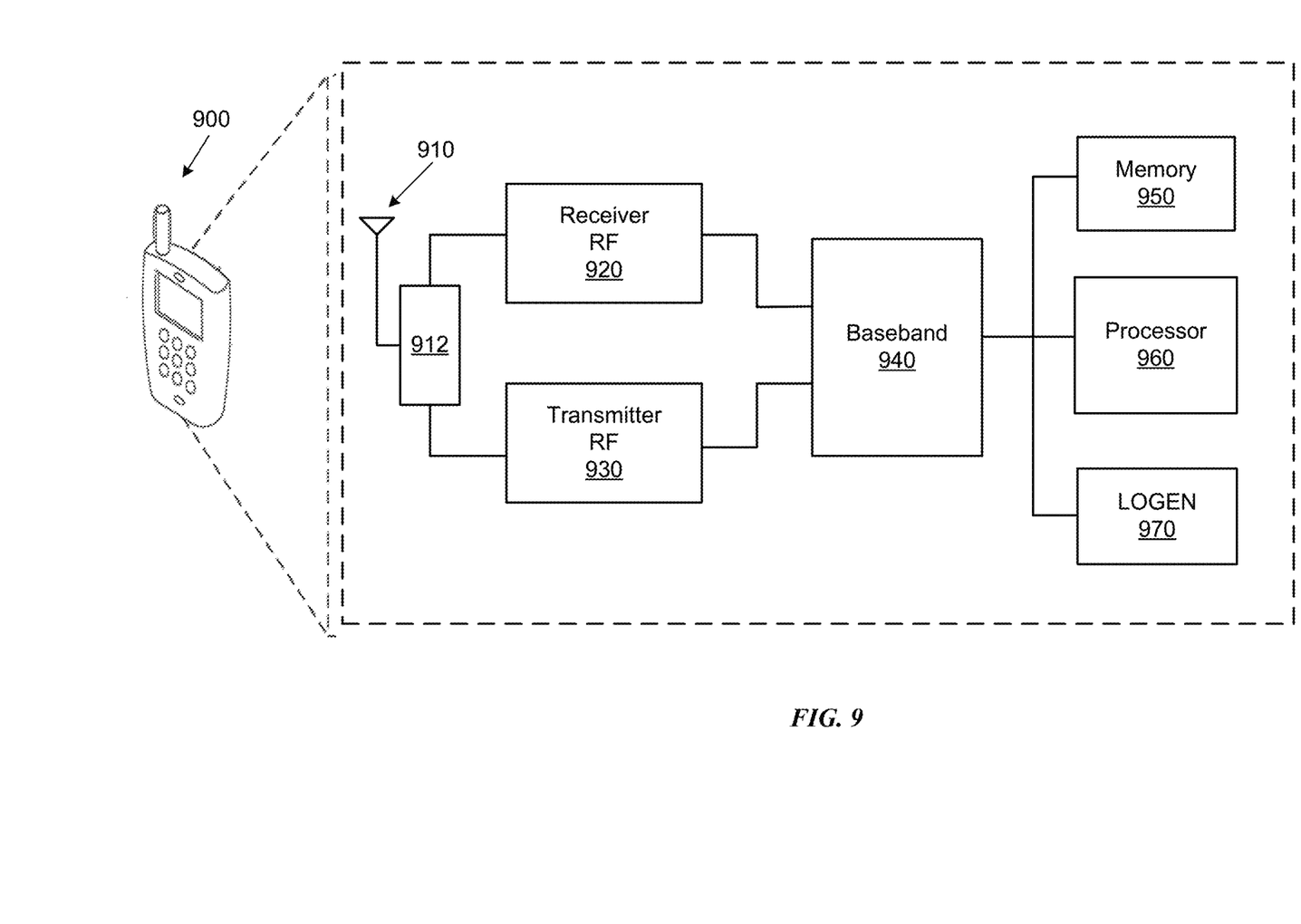
FIG. 9 illustrates an example of a wireless communication device, within which some aspects of the subject technology are implemented.

FIG. 9 illustrates an example of a wireless communication device 900, within which some aspects of the subject technology are implemented. In one or more implementations, the wireless communication device 900 can be a wearable device such as a smartwatch or other electronic apparatus, including one or more health-sense device(s). The wireless communication device 900 may comprise an RF antenna 910, a duplexer 912, a receiver 920, a transmitter 930, a baseband processing module 940, a memory 950, a processor 960, and a local oscillator generator (LOGEN) 970. In various aspects of the subject technology, one or more of the blocks represented in FIG. 9 may be integrated on one or more semiconductor substrates. For example, blocks 920-970 may be realized in a single chip, a single system on a chip, or in a multichip chipset.

The receiver 920 may comprise suitable logic circuitry and/or code that may be operable to receive and process signals from the RF antenna 910. The receiver 920 may, for example, be operable to amplify and/or down-convert received wireless signals. In various aspects of the subject technology, the receiver 920 may be operable to cancel noise in received signals, and may be linear over a wide range of frequencies. In this manner, the receiver 920 may be suitable for receiving signals in accordance with a variety of wireless standards such as Wi-Fi, WiMAX, BT, and various cellular standards. In various aspects of the subject technology, the receiver 920 may not use any sawtooth acoustic wave filters, and a few, or no, off-chip discrete components such as large capacitors and inductors.

The transmitter 930 may comprise suitable logic circuitry and/or code that may be operable to process and transmit signals from the RF antenna 910. The transmitter 930 may, for example, be operable to up-convert baseband signals to RF signals and amplify RF signals. In various aspects of the subject technology, the transmitter 930 may be operable to up-convert and amplify baseband signals processed in accordance with a variety of wireless standards. Examples of such standards may include Wi-Fi, WiMAX, BT, and various cellular standards. In various aspects of the subject technology, the transmitter 930 may be operable to provide signals for further amplification by one or more power amplifiers.

The duplexer 912 may provide isolation in the transmit band to avoid saturation of or damaging parts of the receiver 920, and to relax one or more design requirements of the receiver 920. Furthermore, the duplexer 912 may attenuate the noise in the receiver band. The duplexer 912 may be operable in multiple frequency bands of various wireless standards.

The baseband processing module 940 may comprise suitable logic, circuitry, interfaces, and/or code that may be operable to perform the processing of baseband signals. The baseband processing module 940 may, for example, analyze received signals, generate control, and/or feedback signals for configuring various components of the wireless communication device 900, such as the receiver 920. The baseband processing module 940 may be operable to encode, decode, transcode, modulate, demodulate, encrypt, decrypt, scramble, descramble, and/or otherwise process data in accordance with one or more wireless standards.

The processor 960 may comprise suitable logic, circuitry, and/or code that may enable processing data and/or controlling operations of the wireless communication device 900. In this regard, the processor 960 may be enabled to provide control signals to various other portions of the wireless communication device 900. The processor 960 may also control the transfer of data between various portions of the wireless communication device 900. Additionally, the processor 960 may enable implementation of an OS, or otherwise execute code to manage operations of the wireless communication device 900. In one or more implementations, the processor 960 may be interfaced with transducer modules via existing host interface technologies, such as an inter-integrated circuit (I2C), a serial interface protocol (SPI), a peripheral component interconnect express (PCIE), a universal asynchronous receiver-transmitter (UART), and/or other interface technologies, depending on the data rate needed to sample and pipe from the transducers module to the processor 960.

The memory 950 may comprise suitable logic, circuitry, and/or code that may enable storage of various types of information such as received data, generated data, code, and/or configuration information. The memory 950 may comprise, for example, RAM, ROM, flash, and/or magnetic storage. In various aspects of the subject technology, information stored in the memory 950 may be utilized for configuring the receiver 920, and/or the baseband processing module 940.

The LOGEN 970 may comprise suitable logic, circuitry, interfaces, and/or code that may be operable to generate one or more oscillating signals of one or more frequencies. The LOGEN 970 may be operable to generate digital and/or analog signals. In this manner, the LOGEN 970 may be operable to generate one or more clock signals, and/or sinusoidal signals. Characteristics of the oscillating signals, such as the frequency and duty cycle, may be determined based on one or more control signals from, for example, the processor 960 and/or the baseband processing module 940.

In operation, the processor 960 may configure the various components of the wireless communication device 900 based on a wireless standard, according to which it is designed to receive signals. Wireless signals may be received via the RF antenna 910, amplified, and down converted by the receiver 920. The baseband processing module 940 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device 900, data to be stored to the memory 950, and/or information affecting and/or enabling operation of the wireless communication device 900. The baseband processing module 940 may modulate, encode, and perform other processing on audio, video, and/or control signals to be transmitted by the transmitter 930 in accordance with various wireless standards.

In some implementations, all active components of the wireless communication device 900, for example, the receiver 920, the transmitter 930, the baseband processing module 940, the memory 950, the processor 960, and the LOGEN 970 may receive power from a power supply, including an SMPS including the integrated circuits 200 and 300 of FIGS. 2 and 3 of the subject technology, and benefit from the improved efficiency and EMI reduction of the disclosed technology.

The predicate words "configured to," "operable to," and "programmed to" do not imply any particular tangible or intangible modification of a subject, but rather, are intended to be used interchangeably. For example, a processor configured to monitor and control an operation or a component may also mean the processor is being programmed to monitor and control the operation, or the processor being operable to monitor and control the operation. Likewise, a processor configured to execute code can be construed as a processor programmed to execute code, or operable to execute code.

When an element is referred to herein as being "connected" or "coupled" to another element, it is to be understood that the elements can be directly connected to the other element or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

A phrase such as an "aspect" does not imply that such aspect is essential to the subject technology, or that such aspect applies to all configurations of the subject technology. A disclosure relating to an aspect may apply to all configurations, or one or more configurations. A phrase such as an "aspect" may refer to one or more aspects, and vice versa. A phrase such as a "configuration" does not imply that such configuration is essential to the subject technology, or that such configuration applies to all configurations of the subject technology. A disclosure relating to a configuration may apply to all configurations, or one or more configurations. A phrase such as a "configuration" may refer to one or more configurations, and vice versa.

The word "example" is used herein to mean "serving as an example or illustration." Any aspect or design described herein as an "example" is not necessarily to be construed as preferred or advantageous over other aspects or designs.

All structural and functional equivalents to the elements of the various aspects described throughout this disclosure that are known, or later come to be known, to those of ordinary skill in the art, are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. § 112(f) unless the element is expressly recited using the phrase, "means for" or, in the case of a method claim, the element is recited using the phrase, "step for." Furthermore, to the extent that the term "include," "have," or the like is used in the description or the claims, such term is intended to be inclusive in a manner similar to the term "comprise," as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above, generally in terms of their functionality. Whether such functionality is implemented as hardware or software depends upon the particular application, and design constraints imposed on the overall system. Skilled artisans may implement the described functionality in varying ways for each particular application. Various components and blocks may be arranged differently (e.g., arranged in a different order or partitioned in a different way), all without departing from the scope of the subject technology.

What is claimed is:

1. An apparatus, comprising:
   a circuit including an inductor and a switch configured to allow a current to flow through the inductor and charge a capacitor of the circuit;
   a first circuit coupled to the circuit, wherein the first circuit is configured to simulate an event; and
   a second circuit, comprising a multiplexer, configured to:
      set a threshold for triggering the event, while partially compensating a propagation delay,
      generate, based at least on the propagation delay, a control signal to turn off the switch, and
      provide a particular code for the first circuit to further compensate the propagation delay.

2. The apparatus of claim 1, wherein the event comprises a zero-current crossing event, and wherein at the threshold of the zero-current crossing event, the switch is configured to block discharging the capacitor via a reverse current through the inductor.

3. The apparatus of claim 2, wherein the second circuit is configured to determine a threshold for the zero-current crossing event based on a first code and a second code.

4. The apparatus of claim 3, wherein the second circuit is configured to use the threshold for the zero-current crossing event to determine a time to turn off the switch.

5. The apparatus of claim 3, wherein the first circuit includes a comparator having the propagation delay, and wherein the second circuit is configured to determine the first code by using trimming to capture the propagation delay of the comparator.

6. The apparatus of claim 5, wherein the trimming comprises a closed-loop auto-calibration trimming.

7. The apparatus of claim 5, wherein:
   the first circuit comprises a digital-to-analog converter (DAC) circuit, and
   the multiplexer is configured to:
   receive an output of the comparator,
   generate the control signal to turn off the switch, and
   provide the particular code for the DAC circuit to further compensate the propagation delay.

8. The apparatus of claim 5, wherein:
   the second circuit includes circuitry configured to determine the second code, and
   the second code is based on an input voltage and an output voltage of the circuit.

9. The apparatus of claim 8, wherein the circuitry is configured to determine the second code using a minimum input voltage and a maximum output voltage of the circuit.

10. The apparatus of claim 1, further comprising a third circuit configured to compensate electromagnetic interference in the circuit.

11. An integrated circuit comprising:
a circuit comprising:
a first circuit including an inductor and a switch and coupled to a capacitor;
a second circuit including a comparator; and
a third circuit configured to set a threshold for triggering an event while compensating a propagation delay of the comparator,
wherein the switch is configured to at least partially block discharging of the capacitor via a reverse current through the inductor at the threshold,
wherein the third circuit, comprising a multiplexer, is configured to:
generate, based at least on the propagation delay, a control signal to turn off the switch, and
provide a particular code for the first circuit to further compensate the propagation delay.

12. The integrated circuit of claim 11, wherein the switch is further configured to allow a current to charge the capacitor through the inductor.

13. The integrated circuit of claim 11, the event comprises a current-zero crossing event, and wherein the third circuit is configured to determine a threshold for the current-zero crossing event based on a first code and a second code.

14. The integrated circuit of claim 13, wherein the third circuit is configured to use the threshold for the current-zero crossing event to determine a time to turn off the switch.

15. The integrated circuit of claim 13, wherein the third circuit is further configured to determine the first code by using trimming to capture the propagation delay.

16. The integrated circuit of claim 15, wherein the trimming comprises a closed-loop auto-calibration trimming.

17. The integrated circuit of claim 15, wherein the third circuit is configured to:
receive an output of the comparator,
generate, based on the output, a control signal to turn off the switch, and
provide a code to compensate the propagation delay; and
determine the second code based on an input voltage and an output voltage of the first circuit.

18. A communication device, comprising:
a circuit, comprising:
a first circuit coupled to a capacitor,
a second circuit coupled to the first circuit, the second circuit comprising a comparator, and
a third circuit comprising a multiplexer,
wherein:
the first circuit includes an inductor and a switch operable to allow a current to charge the capacitor through the inductor prior to a current zero-crossing event,
the switch is operable to block discharging of the capacitor via a reverse current through the inductor at a threshold for the current zero-crossing event, and
the third circuit is configured to:
set a threshold for triggering the current zero-crossing event is set while compensating a propagation delay of the comparator,
generate, based at least on the propagation delay, a control signal to turn off the switch, and
provide a particular code for the first circuit to further compensate the propagation delay.

19. The communication device of claim 18, further comprising a third circuit configured to:
implement a procedure to set the threshold for triggering the current zero-crossing event by determining a zero-current threshold based on a first code and a second code;
use the zero-current threshold to determine a time to turn off the switch; and
determine the first code by using trimming to capture the propagation delay of the comparator.

20. The communication device of claim 19, wherein the third circuit is configured to determine the second code that includes dependencies of the comparator on an input voltage and an output voltage of the first circuit.

* * * * *